United States Patent Office 3,822,188
Patented July 2, 1974

3,822,188
METHOD OF PRODUCING 1,4' - DIHYDROXY-3-n-PENTYL - 6,6,9 - TRIMETHYL-6a,7,10,10a-TETRAHYDRODIBENZO[b,d]PYRAN
Earl Elmer Fager, Lake Villa, and Norman Earl Wideburg, Waukegan, Ill., assignors to Abbott Laboratories, North Chicago, Ill.
No Drawing. Original application Oct. 19, 1972, Ser. No. 298,900. Divided and this application Aug. 1, 1973, Ser. No. 384,554
Int. Cl. C07c 67/00
U.S. Cl. 195—51 R                  4 Claims

ABSTRACT OF THE DISCLOSURE

The compound 1,4' - dihydroxy - 3 - n - pentyl-6,6,9-trimethyl - 6a,7,10,10a - tetrahydrodibenzo[b,d]pyran, which can be prepared by microbial transformation of 1-hydroxy-3-n-pentyl - 6,6,9 - trimethyl-6a,7,10,10a-tetrahydrodibenzo[b,d]pyran. The compound is useful as an anti-depressant agent.

DETAILED DESCRIPTION OF THE INVENTION

This is a division of application Ser. No. 298,900 filed Oct. 19, 1972.

This invention relates to 1,4' - dihydroxy - 3 - n - pentyl-6,6,9 - trimethyl - 6a,7,10,10a - tetrahydrodibenzo[b,d]pyran and to methods for its preparation. The derivative is produced by microbial transformation of 1-hydroxy-3-n - pentyl - 6,6,9 - trimethyl - 6a,7,10,10a - tetrahydrodibenzo[b,d]pyran with active cultures or resuspended washed cells.

The compound of this invention represented by formula I

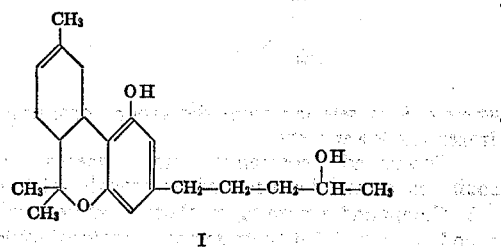

The compound is produced by subjecting 1 - hydroxy-3 - n - pentyl - 6,6,9 - trimethyl - 6a,7,10,10a - tetrahydrodibenzo[b,d]pyran of formula II

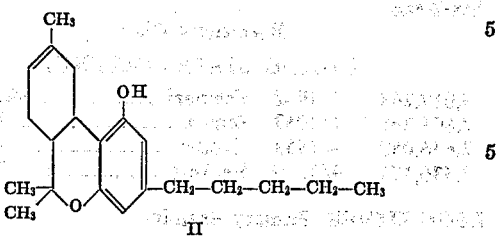

to microbial transformation using a suitable microorganism.

1,4' - Dihydroxy - 3 - n - pentyl - 6,6,9 - trimethyl-6a,7,10,10a - tetrahydrodibenzo[b,d]pyran is useful as an anti-depressant agent at dosages of from 0.5 to 100 mg./kg. of body weight daily. The anti-depressant activity of the compound of this invention was first established in the modified dopa test [Everette, Fed. Proc. 23, p. 198 (1964)].

The microbiological hydroxylation can be accomplished by the following procedure: The micro-organism is inoculated into a medium favorable to its growth. The inoculated fermentation medium is incubated at a favorable constant temperature with agitation on a rotary shaker. The substrate (II) is added to the fermentation after a heavy growth of mycelium has been obtained, usually within 48 hours after inoculation. The substrate, being a gum, can be dissolved in high concentration in acetone or other suitable solvents for tansfer into the fermentation. The preferred level of substrate in the fermentation is between 0.05 and 1.0 g./liter. Incubation and agitation are continued after addition of the substrate as necessary for the microbiological hydroxylation.

Progress of the microbiological hydroxylation can be determined as follows: A 10 ml. aliquot of the whole culture is removed from the fermentation vessel and mixed with 10 ml. of acetone. Then the sample is extracted with 20 ml. of ethyl acetate. The extract is reduced to a residue and the residue is extracted with 2 ml. of acetone. A 100 μl. aliquot of the actone solution is applied to a chromatographic plate precoated with a 0.25 mm. thick layer of silica gel GF-254. The chromatographic plate is developed with diethyl ether in a chromatography tank with a saturated atmosphere, open-faced or with a cover plate to form sandwich plate condition. The developed plate is dried of solvent and sprayed with a solution of Fast Blue B Salt (0.15% in water). The substrate and transformation products are visible as dark red spots on a white background. Substrate (II) is found at $R_f$ 0.7–0.85 and the desired product (I) is found at $R_f$ 0.40–0.45.

The fermenation is harvested at the time of maximum yield of the desired product. The desired product may be separated from the culture by extraction of the whole culture at an appropriate pH with a water immiscible solvent such as ethyl acetate or butanol, or with a mixture of solvents such as ethyl acetate and acetone. Alternatively, the whole culture may be filtered and the filtrate extracted with the solvents indicated and the mycelium cake extracted with water miscible solvents such as actone, methanol or ethanol. The desired product in the residue, after evaporation of the extraction solvent, can be purified by chromatography.

The following examples further illustrate this invention:

Example 1

Microbial transformation of 1-hydroxy-3-n-pentyl-6,6,9-trimethyl-6a,7,10,10a-tetrahydrodibenzo[b,d]pyran Molds, basidiomycetes and actinomycetes, which are known to have hydroxylated other compounds, were selected to test their capacity to hydroxylate 1-hydroxy-3-n - pentyl - 6,6,9 - trimethyl - 6a,7,10,10a - tetrahydrodibenzo[b,d]pyran. The following media were prepared:

Medium I for Molds and Basidiomycetes

|  | Grams |
|---|---|
| Soy Fluff Flour | 5 |
| Yeast Extract | 5 |
| $KH_2PO_4$ | 2.3 |
| $K_2HPO_4$ | 0.4 | in 1 liter with deionized water, was adjusted to pH 6.5. Ten ml. aliquots were dispensed into 50 ml. size screw top glass tubes with stainless steel Morton closures and sterilized by autoclaving at 121° C. for 30 minutes. A 50% weight per unit volume glucose solution was autoclaved separately and added to the sterile ingredients in the fermentation vessel in the amount of 1 ml. of glucose solution to each 10 ml. of vessel contents to complete the medium.

Medium II for Actinomycetes

|  | Grams |
|---|---|
| Soy Bean Meal | 5 |
| Sodium Chloride | 1 |
| Yeast Extract | 2.5 |
| $K_2HPO_4$ | 2.0 |
| $KH_2PO_4$ | 1.0 | in 1 liter with deionized water, was adjusted to pH 6.5–7.0. Ten ml. aliquots were dispensed into 50 ml. size screw top glass tubes with stainless steel Morton closures and sterilized by autoclaving at 121° C. for 30 minutes. A 50% weight per unit volume glucose solution was autoclaved separately and added to the sterile ingredients in the fermentation vessel in the amount of 1 ml. of glucose solution to each 10 ml. of vessel contents to complete the medium.

Tubes of complete sterile medium were inoculated in duplicate with one of the micro-organisms. One seven day old slant of each micro-organism was suspended as completely as possible in 5 ml. of sterile broth composed of 5 grams of glucose, 3 grams of peptone, 3 grams of beef extract, and 1 gram of yeast extract in 1 liter of deionized water and adjusted to pH 7.0. A 1 ml. portion of the broth suspension was used to inoculate each tube. The inoculated media were incubated at 28° C. on a rotary shaker at 250 r.p.m. The cultures showing heavy growth after 48 hours incubation, and the remaining few that required 72 hours incubation, received 5 mg. of substrate (II) in one of the tubes and the duplicate tubes served as a culture control without added substrate. The substrate was added as an acetone solution (50 mg./ml., 0.1 ml. per tube) and all of the cultures were re-incubated on the shaker for an additional 48 hours. Then each of the cultures was mixed with 10 ml. of acetone and 20 ml. of ethyl acetate, shaken vigorously to effect extraction, and centrifuged. The upper solvent phase from each tube was reduced to a residue and the residue was extracted with 2 ml. of acetone. Each acetone solution was applied at 100 μl. to a chromatographic plate precoated with a 0.25 ml. thick layer of silica gel GF-254. The plate was developed with diethyl ether, dried of solvent and sprayed with Fast Blue B salt reagent. Results are summarized in Table I following. This table lists cultures which yielded transformation products with an $R_f$ of 0.40–0.45. The relative intensity of the red color produced by the reagent is indicated as barely visible (±), clearly visible (+) and more intense (++ or +++). The most intensely visible spot, indicated by (+++), represents a 2–4% conversion of substrate added to the fermentation. The code following the name of each organism designates the following:

NRRL—means the culture is on deposit with and available from the Northern Utilization Research and Development Division, United States Department of Agriculture, Peoria, Ill. 61604.

ATCC—means the culture is on deposit with and available from the American Type Culture Collection, Rockville, Md. 20852.

QM—means the culture is on deposit with and available from the Mycology Laboratory, U.S. Army Natick Laboratories, Natick, Mass. 01762.

Codes other than any of these above three means the organism is from the Culture Collection at Abbott Laboratories, North Chicago, Ill. 60064.

TABLE I

| Organism | Medium used | Substrate, $R_f$ | Yield of product with $R_f$ .40–.45 |
|---|---|---|---|
| Aspergillus fonsecaeus NRRL 67 | I | .72 | + |
| Cunninghamella blakesleeana NRRL 1369. | I | .78 | +++ |
| Cunninghamella blakesleeana QM 631. | I | .75 | + |
| Cunninghamella elegans ATCC 9245. | I | .78 | ++ |
| Cunninghamella elegans (+) QM 6784. | I | .75 | ++ |
| Cunninghamella bainieri ATCC 9244. | I | .75 | ++ |
| Mucor parasiticus ATCC 6476. | I | .78 | ± |
| Absidia cylindrospora NRRL 2796. | I | .75 | + |
| Coprinus sclerotigenus NRRL 3306. | I | .78 | + |
| Streptomyces cinnamoneous NRRL B-1285. | II | .83 | + |
| Streptomyces viridoflavus NRRL B-1548. | II | .83 | + |
| Streptomyces cinereoerocatus NRRL 3443. | II | .83 | ± |
| Actinomycete Sp. ACT-45 | II | .83 | + |

Example 2

Microbiological hydroxylation of 1-hydroxy-3-n-pentyl-6,6,9 - trimethyl - 6a,7,10,10a - tetrahydrodibenzo[b,d]pyran to 1,4'-dihydroxy-3-n-pentyl-6,6,9-trimethyl-6a,7,10,10a-tetrahydrodibenzo[b,d]pyran Cunninghamella blakesleeana NRRL 1369 was grown in 500 ml. Erlenmeyer flasks closed with cotton plugs. One hundred and ten flasks each containing 110 ml. of complete sterile Medium I, described in Example 1, were inoculated with a broth suspension of seven day old agar slants of the micro-organism, one agar slant suspension per flask. The inoculated medium was incubated at 28° C. on a rotary shaker at 250 r.p.m. Twenty-five mg. of substrate (II) in 0.5 ml. acetone was added to each flask after 48 hours incubation. The contents of all the flasks were combined after an additional 24 hours incubation and the whole culture was extracted with a 4 liter and a 2 liter portion of heptane and 4 times with 2 liter portions of ethyl acetate. Then the culture was filtered and the solids fraction was extracted another 6 times with 2 liter portions of acetone, allowing time for diffusion of the acetone solubles into the acetone. The greater portion of the desired product was found in these acetone extractions of the mycelium. All extracts containing significant amounts of the desired product were combined and the solvents were removed. The bulky oily residue, dissolved in heptane, was applied to a short, silica gel GF-254 column. Solvent mixtures of increasing polarity (by increasing ethyl acetate concentration in heptane) were used to elute materials from the column. The bulk of impurities were eluted with heptane and heptane:ethyl acetate (80:20) while the desired product was eluted in the latter portion of heptane:ethyl acetate (50:50). Final purification of the product was accomplished by preparative thin-layer chromatography on silica gel GF-254 developed with diethyl ether. The segment of silica gel containing the product was eluted with methanol, the eluate residue was extracted with heptane:chloroform to remove residual silica gel, the heptane:chloroform was removed and the residue was dried to yield 52.5 mg. of the desired pure product, as a gum.

The structure of the product was determined by proton magnetic resonance and mass spectrometry. High resolution mass spectrometry at 50 e.v. gave a molecular ion at m/e 330.2197 (calculated for $C_{21}H_{30}O_3$, 330.2195). The prominent fragment ions and their assignments are given in Table II. Comparison of these data with the mass spectrum of 1-hydroxy-3-n-pentyl-6,6,9-trimethyl-6a,7,10,10a-tetrahydrodibenzo[b,d]pyran [H. Budzikiewicz et al., Tetrahedron, 21, 1881 (1965); U. Claussen et al., Tetrahedron, 22, 3535 (1966)] showed that the product was a monohydroxylated derivative of 1-hydroxy-3-n-pentyl-6,6,9-trimethyl - 6a,7,10,10 - tetrahydrodibenzo[b,d]pyran. The peak at m/e 258 suggests that the position of hydroxylation is on the n-pentyl side chain. The exact position of hydroxylation was determined by proton magnetic resonance spectrometry. The spectrum was determined at 100 MHz. in CDCl₃ with tetramethylsilane as the internal standard. The chemical shifts are given in Table III. The assignments were made by analogy with the spectrum of 1-hydroxy-3-n-pentyl-6,6,9-trimethyl-6a,7,10,10a-tetrahydrodibenzo[b,d]pyran [R. A. Archer et al., J. Amer. Chem. Soc., 92, 5200 (1970)]. The only resonances present in the spectrum of the product and not present in the spectrum of 1-hydroxy-3-n-pentyl-6,6,9-trimethyl - 6a,7,10,10a - tetrahydrodibenzo[b,d] pyran are the sextet at 3.82 p.p.m. and the doublet at 1.18 p.p.m. These can arise only from the hydroxylation of the product at the 4'-position.

TABLE II

Mass spectrum of 1,4'-dihydroxy-3-n-pentyl-6,6,9-trimethyl-6a,7,10,10a-tetrahydrodibenzo[b,d]pyran

| m/e | Relative intensity | Assignment |
|---|---|---|
| 330 | 100 | M |
| 315 | 8 | M-$CH_3$ |
| 312 | 6 | M-$H_2O$ |
| 297 | 3 | M-$CH_3$-$H_2O$ |
| 287 | 13 | M-$C_3H_7$ |
| 269 | 9 | M-$C_3H_7$-$H_2O$ |
| 262 | 11 | M-$C_5H_8$ |
| 258 | 23 | M-$C_4H_8$ |
| 247 | 67 | {287-$C_3H_4$ / 262-$CH_3$} |
| 245 | 67 | M-$C_5H_9O$ |
| 213 | 21 | {287-$C_4H_{10}O$ / 269-$C_4H_8$} |

TABLE III

Proton magnetic resonance spectrum of 1,4'-dihydroxy-3-n-pentyl-6,6,9-trimethyl - 6a,7,10,10a - tetrahydrodibenzo[b,d]pyran

| Assignment: | Chemical Shift (S)[1] |
|---|---|
| 6α-$CH_3$ | 1.09 (s). |
| —CHOH—C$\underline{H}_3$ | 1.18 (d, $J$=6 Hz.). |
| 6β-$CH_3$ | 1.36 (s). |
| 9-$CH_3$ | 1.69 (br s). |
| PhC$\underline{H}_2$ | 2.45 (t, $J$=7.5 Hz.). |
| 10a-$\underline{H}$ | 2.71 (m). |
| 10α-H | 3.24 (dd, $J$=16 Hz., 4 Hz.). |
| —$CH_2$—C$\underline{H}$OH—$CH_3$ | 3.82 (sextet, $J$=6 Hz.). |
| 8-H | 5.41 (m.). |
| 2-H | 6.09 (d, $J$=1.8 Hz.). |
| 4-H | 6.24 (d, $J$=1.8 Hz.). |

[1] The chemical shifts are given in parts per million. Abbreviations: s=singlet, d=doublet, t=triplet, m=multiplet, dd=doublet of doublets, br=broad.

The compounds useful in the practice of this invention can be formulated into various pharmaceutically acceptable dosage forms such as tablets, capsules, pills and the like, for immediate or sustained release, by combining the compound with a suitable pharmaceutically acceptable carrier or diluent according to methods well known in the art. Such dosage forms may additionally include lubricants, excipients, binders, fillers, flavoring and sweetening agents and other therapeutically inert ingredients necessary for the formulation of the desired preparation.

We claim:

1. A method of producing 1,4'-dihydroxy-3-n-pentyl-6,6,9-trimethyl - 6a,7,10,10a - tetrahydrodibenzo[b,d] pyran by microbial transformation of 1-hydroxy-3-n-pentyl-6,6,9-trimethyl - 6a,7,10,10a - tetrahydrodibenzo[b,d]pyran comprising the steps of inoculating a microorganism selected from the group consisting of *Cunninghamella blakesleeana* NRRL 1369, *Aspergillus fonsecaeus* NRRL 67, *Cunninghamella blakesleeana* QM 631, *Cunninghamella elegans* ATCC 9245, *Cunninghamella elegans* (+) QM 6784, *Cunninghamella bainieri* ATCC 9244, *Absidia cylindrospora* NRRL 2796, *Coprinus sclerotigenus* NRRL 3306, *Streptomyces cinnamoneous* NRRL B–1285, *Streptomyces viridoflavus* NRRL B–1548, or *Actinomycete* ACT–45 into a fermentation medium and incubating for a sufficient time to allow growth; adding said 1-hydroxy-3-n-pentyl - 6,6,9 - trimethyl-6a,7,10,10a-tetrahydrodibenzo[b,d]pyran substrate to the fermentation medium, incubating said inoculated medium containing said substrate for a time sufficient to allow the conversion to take place; and isolating said 1,4'-dihydroxy-3-n-pentyl-6,6,9-trimethyl - 6a,7,10,10a - tetrahydrodibenzo[b,d]pyran.

2. The method of claim 1 wherein the microorganism is *Cunninghamella blakesleeana* NRRL 1369.

3. The method of claim 2 wherein said microorganism is incubated for 24 to 72 hours prior to the addition of said substrate.

4. The method of claim 3 wherein said substrate is added to said inoculated fermentation medium in an amount of from 0.05 to 1.0 g./liter of medium.

References Cited

UNITED STATES PATENTS 3,388,136   6/1968   Taylor et al. _____ 260—345.3

OTHER REFERENCES

Archer et al., JACS 92, pp. 5200–6 (1970).
Chem. Abstracts 74: 1376s (1971).
Allen et al., J. of Bacteriology, August (1970), pp. 426–34.

A. LOUIS MONACELL, Primary Examiner
T. G. WISEMAN, Assistant Examiner

UNITED STATES PATENT OFFICE
CERTIFICATE OF CORRECTION

Patent No. 3,822,188             Dated July 2, 1974

Inventor(s) Earl Elmer Fager, Norman Earl Wideburg

It is certified that error appears in the above-identified patent and that said Letters Patent are hereby corrected as shown below:

Under Column 5, Table II, delete the line that reads

"258------------ 23 M-$C_4H_8$" and substitute therefor:

--258------------ 23 M-$C_4H_8O$--

Signed and sealed this 11th day of February 1975.

(SEAL)
Attest:

RUTH C. MASON
Attesting Officer

C. MARSHALL DANN
Commissioner of Patents
and Trademarks